(12) United States Patent
Sun et al.

(10) Patent No.: US 9,122,545 B2
(45) Date of Patent: Sep. 1, 2015

(54) INTERFACING A MULTIMEDIA APPLICATION BEING EXECUTED ON A HANDSET WITH AN INDEPENDENT, CONNECTED COMPUTING DEVICE

(75) Inventors: Samuel K. Sun, San Diego, CA (US); Simon Teplitsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1217 days.

(21) Appl. No.: 12/707,018

(22) Filed: Feb. 17, 2010

(65) Prior Publication Data

US 2011/0201322 A1  Aug. 18, 2011

(51) Int. Cl.
*H04B 1/38* (2015.01)
*G06F 9/54* (2006.01)
*G06F 9/44* (2006.01)

(52) U.S. Cl.
CPC ............ *G06F 9/542* (2013.01); *G06F 9/4445* (2013.01); *G06F 2209/544* (2013.01); *G06F 2209/545* (2013.01)

(58) Field of Classification Search
CPC ......... H04L 67/04; H04L 67/12; H04L 67/26; H04L 67/2804; H04L 67/306; H04L 12/581; H04L 12/5895; H04L 12/1836; H04L 12/4641; H04W 80/04; H04W 4/24; H04W 88/02; H04W 80/00; H04W 8/22; H04W 24/02; H04W 4/005; B60K 2350/1004; H04M 1/72552; H04M 2201/38; H04M 2203/2072; H04M 2215/2013; H04M 2215/204
USPC ................ 455/414.1, 420, 557, 422.1, 426.1, 455/556.2, 41.2, 344, 346, 352; 709/204, 709/238, 201, 203, 227, 230, 245, 248, 709/223; 345/1.1, 2.1, 3.1, 2.3
See application file for complete search history.

(56) References Cited

U.S. PATENT DOCUMENTS 6,128,484 A * 10/2000 Singkornrat et al. ......... 455/420
6,714,233 B2    3/2004 Chihara et al.
(Continued)

FOREIGN PATENT DOCUMENTS

CN    1446333 A    10/2003
EP    1213896 A1   6/2002
(Continued)

OTHER PUBLICATIONS

International Search Report and Written Opinion—PCT/US2011/024235—ISA/EPO—Jun. 8, 2011.
(Continued)

*Primary Examiner* — Sujatha Sharma
(74) *Attorney, Agent, or Firm* — Ralphael Freiwirth

(57) ABSTRACT

Embodiments are directed to interfacing a multimedia application being executed on a handset with an independent computing device. A connection between the handset and the computing device is established, which triggers a proxy application to be launched on the computing device. The proxy application is configured to interact with an agent application that runs on the handset. The computing device receives one or more user inputs associated with the multimedia application, and one or more messages are sent from the proxy application to the agent application based on the user inputs. The handset modifies the execution of the multimedia application based in part on the one or more messages conveyed to the agent application from the handset, and the handset also sends media and/or signaling related to the multimedia application to the computing device.

42 Claims, 11 Drawing Sheets

(56) References Cited

U.S. PATENT DOCUMENTS

| | | | |
|---|---|---|---|
| 7,257,122 B1* | 8/2007 | Keturi | 370/401 |
| 7,783,702 B2* | 8/2010 | Liu et al. | 709/204 |
| 7,928,842 B2* | 4/2011 | Jezierski et al. | 340/540 |
| 2002/0138847 A1* | 9/2002 | Abrams et al. | 725/105 |
| 2003/0161297 A1* | 8/2003 | Noda et al. | 370/352 |
| 2003/0212750 A1* | 11/2003 | Butt | 709/208 |
| 2005/0177718 A1* | 8/2005 | Chiorazzi | 713/160 |
| 2006/0039389 A1* | 2/2006 | Burger et al. | 370/401 |
| 2006/0174026 A1* | 8/2006 | Robinson et al. | 709/231 |
| 2008/0072244 A1 | 3/2008 | Eker et al. | |
| 2008/0184269 A1 | 7/2008 | Avery et al. | |
| 2008/0248834 A1* | 10/2008 | Chatterjee et al. | 455/557 |
| 2009/0099836 A1* | 4/2009 | Jacobsen et al. | 704/3 |
| 2010/0071021 A1* | 3/2010 | Friedman | 725/133 |
| 2011/0093822 A1* | 4/2011 | Sherwani | 715/863 |
| 2012/0038541 A1* | 2/2012 | Song et al. | 345/1.1 |
| 2012/0162536 A1* | 6/2012 | Sibilsky et al. | 348/734 |
| 2013/0238165 A1* | 9/2013 | Garrett et al. | 701/2 |

FOREIGN PATENT DOCUMENTS

| | | |
|---|---|---|
| JP | 2002328806 A | 11/2002 |
| JP | 2003283693 A | 10/2003 |
| JP | 2004343566 A | 12/2004 |
| JP | 4182753 B2 | 11/2008 |
| WO | 0199393 A1 | 12/2001 |
| WO | WO0197014 A2 | 12/2001 |
| WO | WO2006074110 A2 | 7/2006 |

OTHER PUBLICATIONS

X Windows: "OThe Great Integrator", IEE Review, London, GB, vol. 36, No. 6, Jun. 21, 1990, pp. 219-222, XP000565898.

\* cited by examiner

INTERFACING A MULTIMEDIA APPLICATION BEING EXECUTED ON A HANDSET WITH AN INDEPENDENT, CONNECTED COMPUTING DEVICE

FIELD OF DISCLOSURE

Embodiments relate to interfacing a multimedia application configured for execution on a handset with an independent, connected computing device.

BACKGROUND

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventional docking stations for portable devices allow mobile device(s) to be connected to external workstation(s). However, conventional docking stations for portable devices typically export only basic device functions. For example, data synchronization applications perform data synchronization, but do not provide a real-time user experience of the application on the mobile device. Further, data card interfaces may allow the mobile device to be used by a workstation as a data modem, but they do not provide access to the user interface layer applications on the mobile device. Voice over internet (VoIP) protocol phone switches can provide specific functional tie-ins such as being able to initiate a phone call by clicking on a phone number. However, VoIP phone switches merely exercise a specific function of the mobile device, receiving a call, and do not actually export the user experience from the mobile device.

SUMMARY

Embodiments are directed to interfacing a multimedia application being executed on a handset with an independent computing device. A connection between the handset and the computing device is established, which triggers a proxy application to be launched on the computing device. The proxy application is configured to interact with an agent application that runs on the handset. The computing device receives one or more user inputs associated with the multimedia application, and one or more messages are sent from the proxy application to the agent application based on the user inputs. The handset modifies the execution of the multimedia application based in part on the one or more messages conveyed to the agent application from the handset, and the handset also sends media and/or signaling related to the multimedia application to the computing device.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
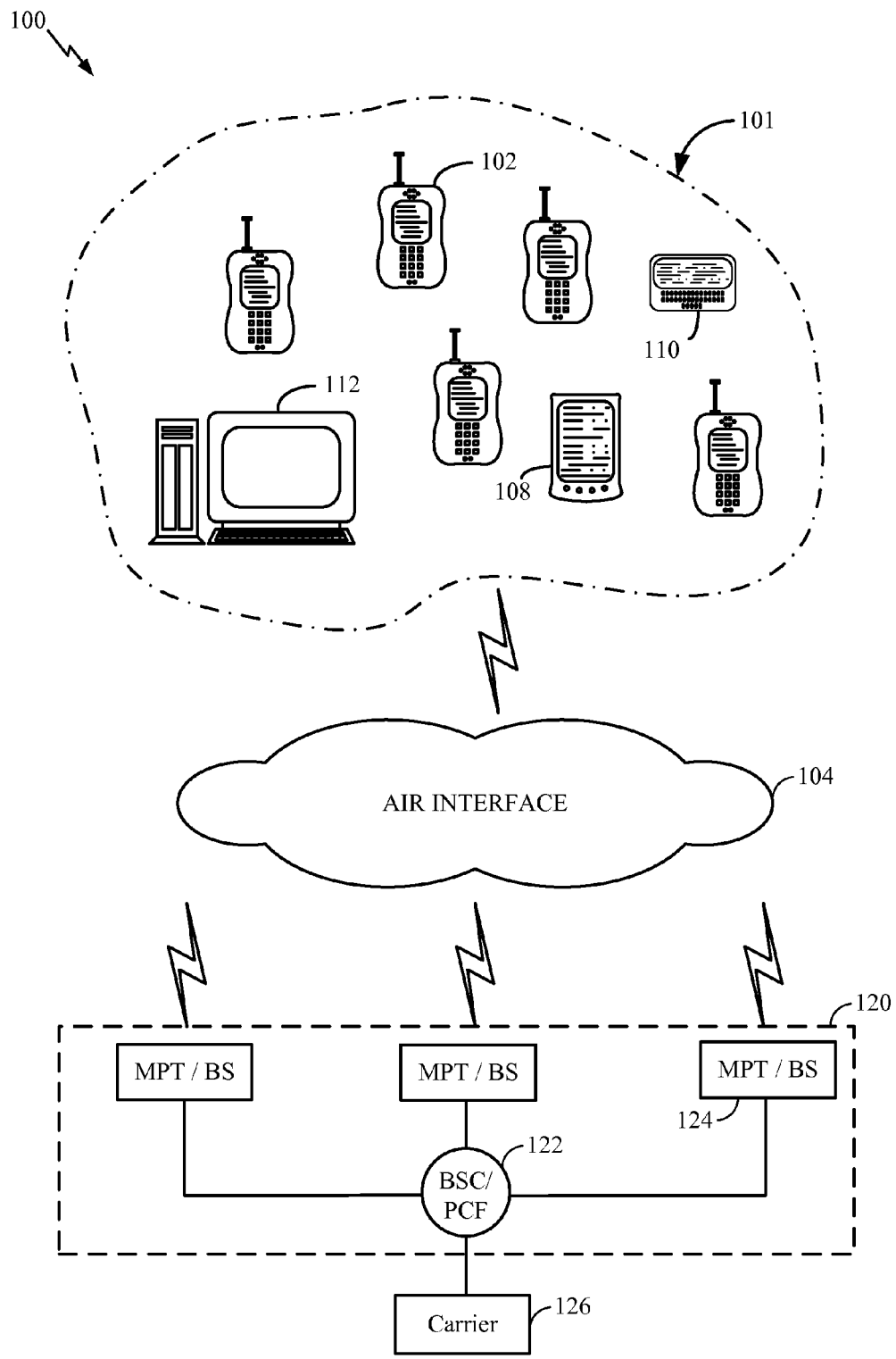
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
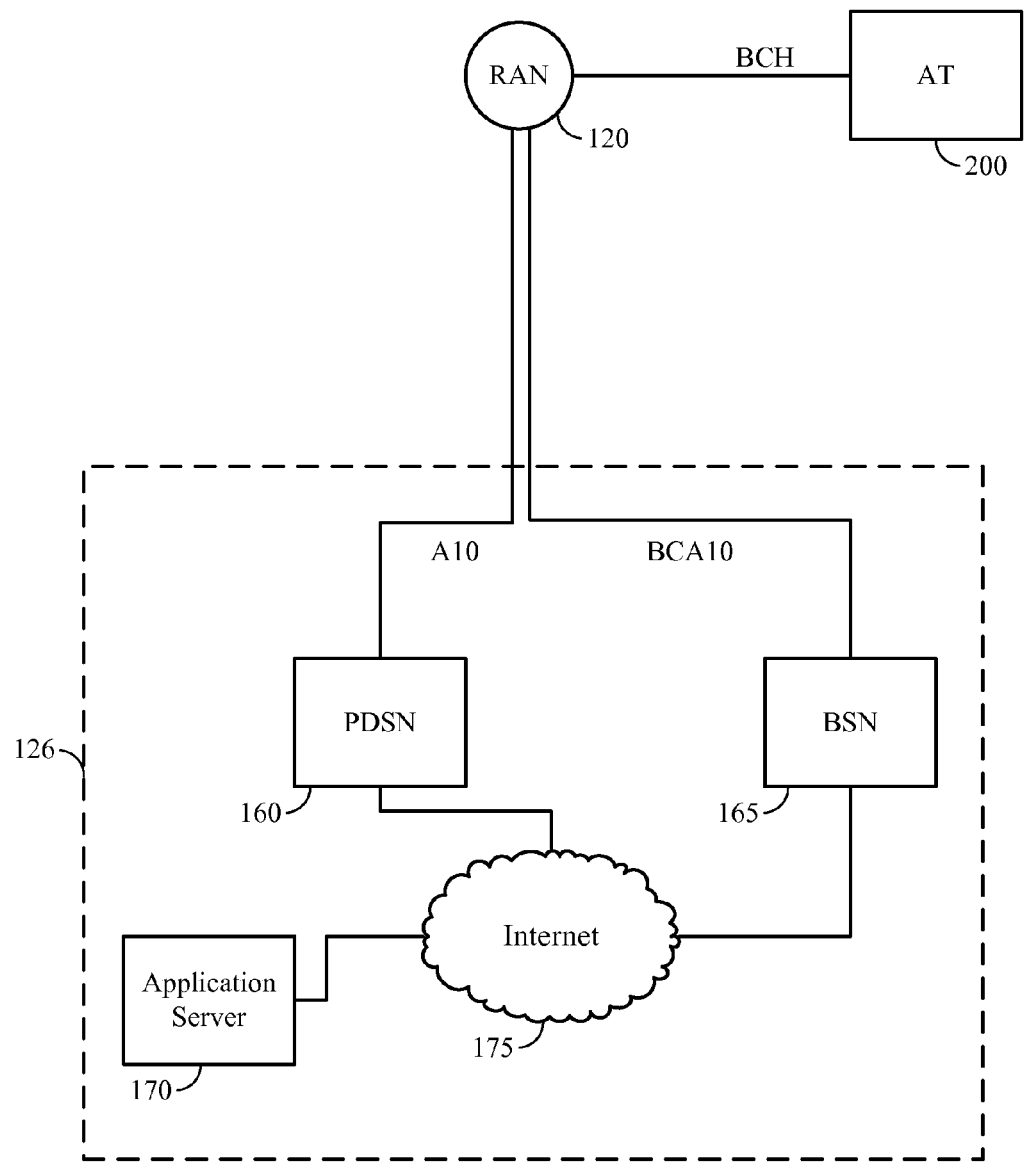
FIG. 2 illustrates the carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 may send unicast messaging to the PDSN 160 via the Internet 175, and may send multicast messaging to the BSN 165 via the Internet 175.

Figure 3:
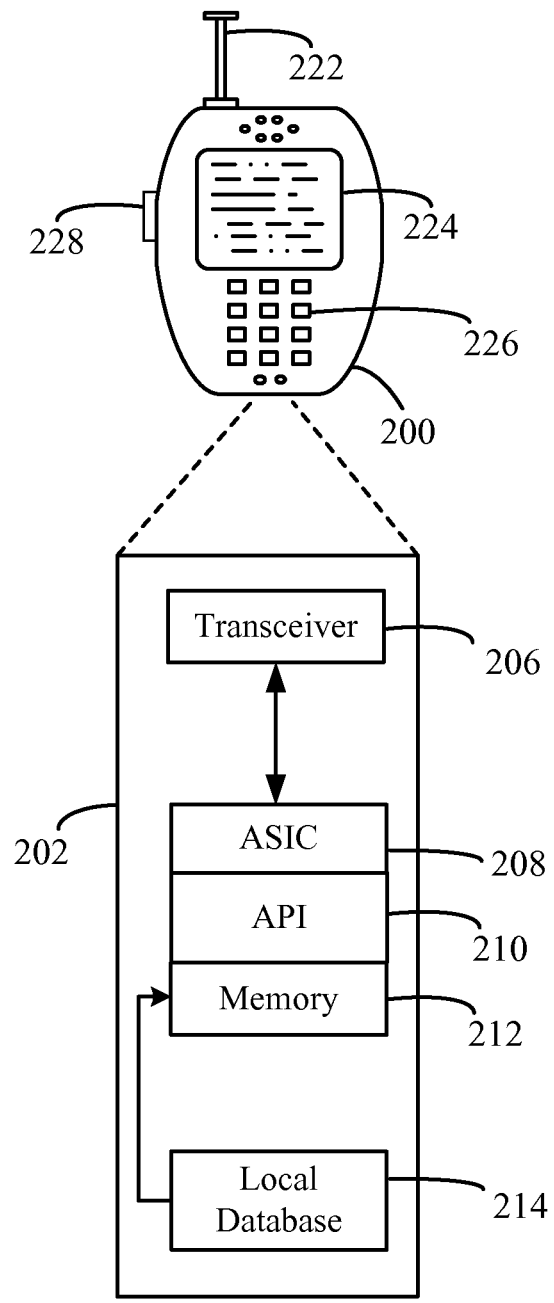
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), orthogonal frequency division multiple access (OFDMA), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
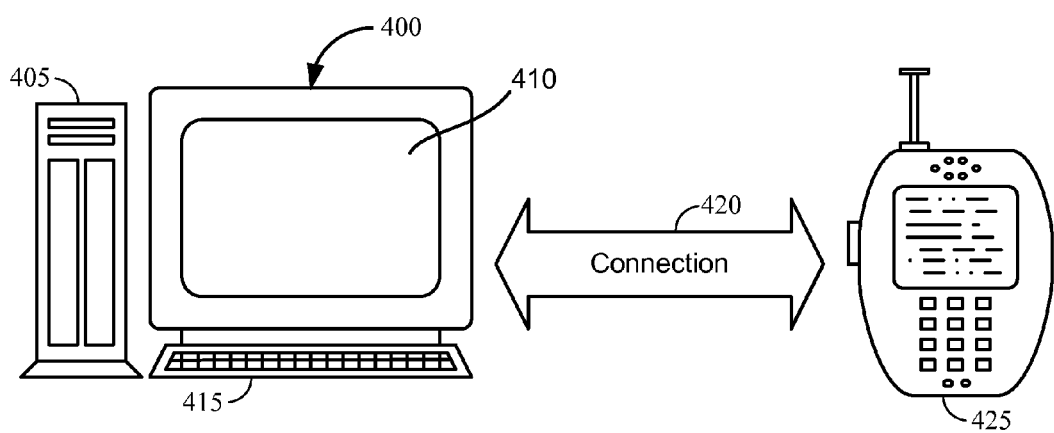
FIG. 4 illustrates an example of an exemplary access terminal connected to an exemplary workstation.

FIG. 4 illustrates an example of an access terminal 425 of wireless communication system 100 of FIG. 1 in more detail. In particular, referring to FIG. 4, access terminal 425 can be connected to workstation 400 via connection 420. The connection 420 may be a wired, wireless or an optical connection. For example, when embodied as a wired connection, the connection 420 can include a universal serial bus type connections (USB) or other standard interfaces (e.g., IEEE 1394 or 'Firewire' connection, a proprietary connection such as used by Apple iPods, etc.). In another example, when embodied as a wireless connection, the connection 420 can include a Bluetooth connection or other short-range wireless connection. In yet another example, the connection 420 can include, in part, an Internet Protocol (IP) connection such that the workstation 400 and access terminal 425 need not be geographically co-located or 'directly' connected, but rather can interface via a remote (or local) connection via well-known routing protocols such as IP.

The workstation 400 may include input/output (IO) device 415 which can be utilized to input and output data to computer 405. The computer 405 can include any conventional computer architecture elements including ASICs, other processor, microprocessor, logic circuit, or other data processing device(s) and/or memory devices that can be used to store data. The computer 405 can perform computation upon any data types that may be input or output by the IO device 415 or any data types being performed by the processors of computer 405. Further, the workstation 400 may also include a display portion 410 which can be utilized to display data output by the computer 405. A graphical user interface (GUI) may be executed on the computer 405 and may be displayed on the display portion 410. The GUI may provide the user a simulated version of the access terminal 425 from the workstation 400 via the connection 420. The GUI may allow the user to remotely control the access terminal 425 from the workstation 400. Furthermore, the IO device 415 may provide expanded functionality that may not be provided by the access terminal 425 due to the access terminal's limited size.

The workstation 400 can be connected to the access terminal 425 such that the two devices may be viewed as being synchronized with each other. However, unlike conventional docking stations for portable devices which export only basic device functions, the connection 420 between the access terminal 425 and the workstation 400 can extend the docking station capability to include the entire user experience from the workstation 400. Therefore, the workstation 400 may provide a full-environment to any applications that may reside on the access terminal 425 and may not be limited to specific applications contained within the access terminal 425. In other words, the workstation 400 is not necessarily configured to supplant the access terminal 425's own applications with its superior processing resources, but rather to function as an extended interface or peripheral through which a user of the access terminal 425 can interact with the applications being executed thereon. Further, the connection 420 can allow the user experience of any applications residing on the access terminal 425 to be exported to workstation 400. However, even when the connection 420 is being utilized between access terminal 425 and workstation 400, the applications that are being executed on the access terminal 425 are not being directly executed by the workstation 400. Thus, the workstation 400 may provide access to the applications located on the access terminal 425, but the workstation 400 may not actually execute the applications located on the access terminal 425. Further, the workstation 400 may provide input data to the access terminal 425 via the use of the IO device 415.

Figure 5:
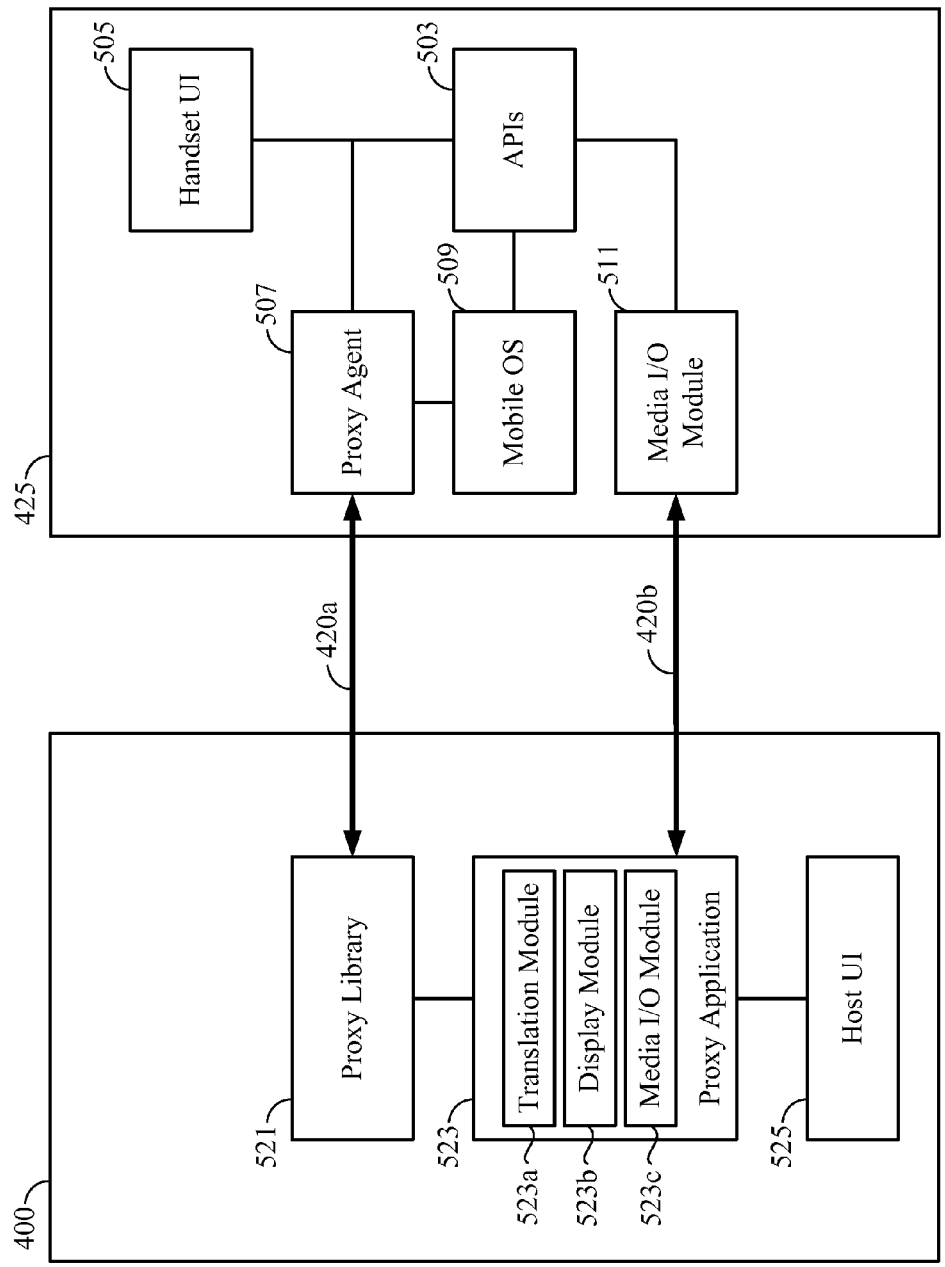
FIG. 5 illustrates a more detailed example of the exemplary access terminal and workstation of FIG. 4.

FIG. 5 illustrates an example of the access terminal 425 and workstation 400 of wireless communication system 100 of FIG. 4 in more detail. In particular, referring to FIG. 5, access terminal 425 may include application programming interface(s) (APIs) 503, handset user interface (UI) 505, proxy agent 507, mobile operating system (OS) 509 and media IO module 511.

APIs 503 may include a set of routines, data structures, object classes and/or protocols provided by libraries and/or operating system services in order to support the building of applications. The handset user interface 505 may provide means of displaying the input and output provided to/from the user. The handset user interface 505 may display the commands utilized by the access terminal 425 including, for example, images, pictures, videos, games, text messages, video messages, web browsing/pages, emails, etc.

The proxy agent 507 may provide a remote procedure call mechanism to the APIs 503, handset UI 505 and/or OS 509. The mobile OS 509 is an application development platform that may include Binary Runtime Environment for Wireless (BREW) or any other similar environment (e.g., Symbian, Android, PalmOS, etc.). For example, BREW is a software platform that can download and run small programs for playing games, sending messages, sharing photos, etc. BREW can act between the application and the wireless device on-chip operating system in order to allow programmers to develop applications without needing to code for system interface or understand wireless applications. The media IO module 511 can be utilized to input and output data to the access terminal 425 and can also interact with serial data interfaces including modems. The media IO module 511 can include audio devices including headset jacks, mouse devices, keyboard devices and video devices.

The workstation 400 may include proxy library 521, proxy application 523 and host UI 525. The workstation 400 can be connected to the access terminal 425 via connection 420a and connection 420b. Connection 420a can be utilized to connect the proxy agent 507 and the proxy library 521. Further, connection 420a can include a serial connection that may exchange signaling information (e.g., instructions to execute applications, exchanging information other than media that is associated with a communication session such as a calling party identifier, etc.). Connection 420b can be used to connect the media IO module 511 and the proxy application 523 in order to exchange multimedia data (e.g., video, audio, etc.). As will be appreciated, the connection 420b is illustrated as a two-way or bi-directional connection because media input on the workstation 400 (e.g., via some type of enhanced input mechanism not available on the access terminal 425, such as a mouse, keyboard, etc.) can be related to the access terminal 425 via the connection 420b, or alternatively media received at or generated at the access terminal 425 can be relayed to the workstation 400 to obtain some type of enhanced output. While FIG. 5 illustrates the connection 420 from FIG. 4 as partitioned into two separate connections 420a and 420b, it will be appreciated that other embodiments can be directed towards implementing the connection 420 as a single bi-directional connection configured to exchange both signaling and media between the workstation 400 and access terminal 425.

The proxy library 521 interfaces with the proxy agent 507 via the connection 420a. The proxy library 521 can include data to perform procedural calls/commands to the proxy agent 507, and can also receive signaling messages from the proxy agent 507.

The proxy application 523 includes translation module 523a, display module 523b and media IO Module 523c. The proxy application's 523 general function is to be the workstation's 400 terminal or point of access for interacting with the multimedia applications or APIs 503 being executed on the access terminal 425.

The translation module 523a can translate the format of commands recognized by the media IO module 523c to the format recognized by proxy library 521 and/or proxy agent 507 (if different).

The display module 523b can be utilized to display data output by the workstation 400 including the host UI 525 and any applications that are being run on the access terminal 425.

The media IO module 523c may include audio devices including headset jack(s), mouse device(s), keyboard devices and video devices. The media IO module 523c may provide expanded functionality that may not be provided by the access terminal 425 due to the access terminal's limited size. For example, the media IO module 523c and the display module 523b may display video in an enhanced HD format, even though the access terminal 425 can only display the media in a format with a lower resolution.

The Host UI 525 may be executed on the workstation 400 and may be displayed on the display module 523b. The host UI 525 may provide the user a simulated version of the access terminal 425 from the workstation 400 via the connections 420a and 420b.

Figure 6:
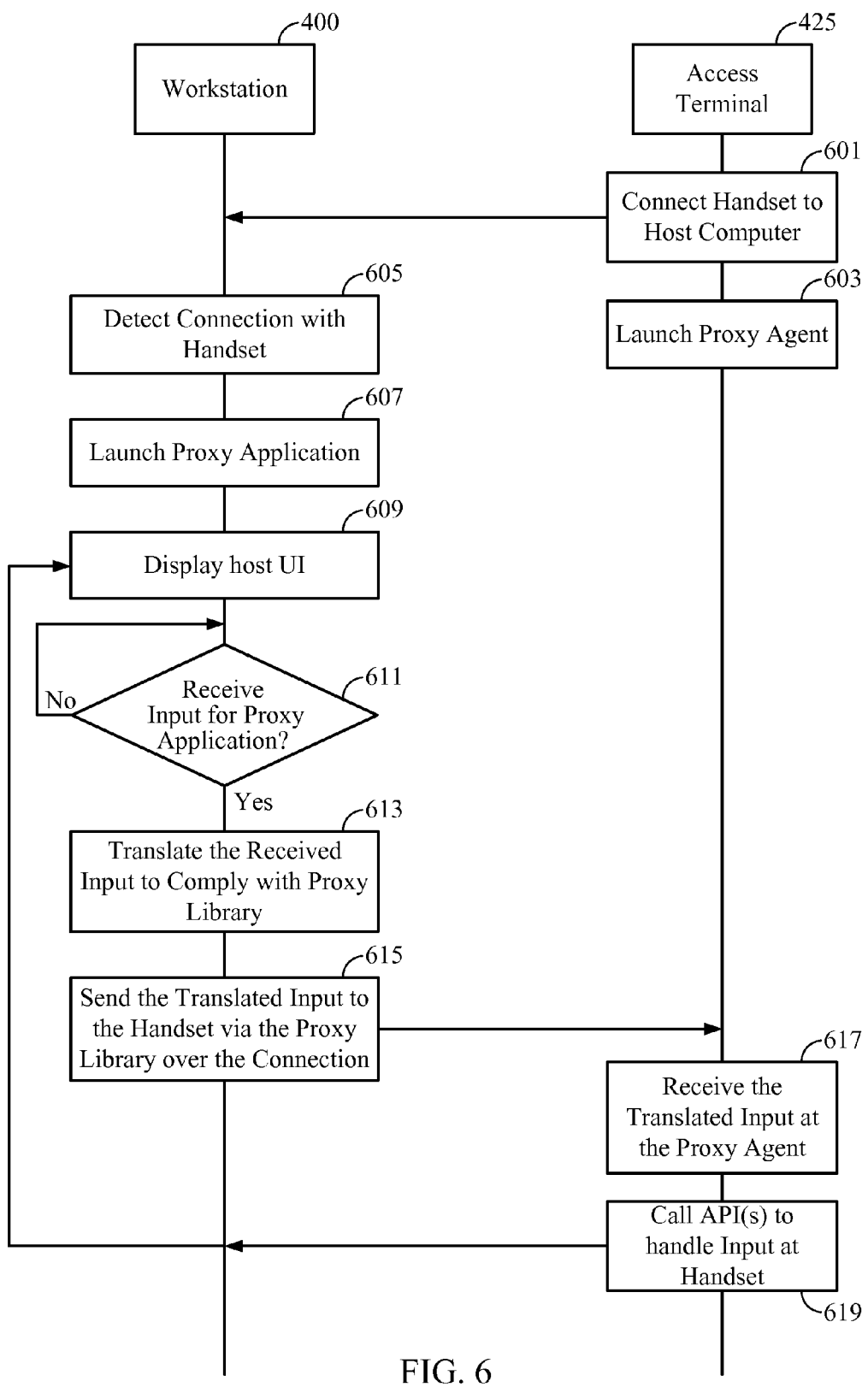
FIG. 6 illustrates an exemplary process of exporting a handset application's user interface to a workstation in accordance with at least one embodiment of the invention.

FIG. 6 illustrates a process of exporting a handset application's user interface to a workstation according to an embodiment of the present invention. Referring to FIG. 6, the access terminal 425 can be connected to a workstation 400. For example, in this exemplary embodiment the access terminal 425 is not utilized while docked with the workstation 400. If the user of the access terminal 425 were to input data to the access terminal, the user would be required to input data at the workstation 400.

Accordingly, the access terminal 425 can be connected to the workstation 400 via connection 420, 601. Next, the proxy agent application is launched on the access terminal 425, 603. Afterwards, the workstation 400 can detect the connection 420 with the access terminal 425, 605. Subsequently, the workstation 400 can launch the proxy application 523, 607. Next, the workstation 400 can display the host UI 525, 609. In an alternative embodiment, the launching of the proxy agent application in 603 on the access terminal 425 can be triggered after the launch of the proxy application in 607 at the workstation 400. In this example, the proxy application can send a signaling message over connection 400 after launching the proxy application in 607, and the access terminal 425 can launch the proxy agent in 603 upon receipt of the signaling message.

Afterwards, the workstation 400 can determine if input data has been received by the proxy application 523, 611. If input data has been received by the workstation 400, then the process proceeds to 613. If input data has not been received by the workstation 400, then the process proceeds to 611.

Subsequently, the workstation 400 can translate the received input data to comply with the requirements of the proxy library 521, 613. The received input data can be translated in order to account for any discrepancies in format between the received input data and the proxy library 521. Next, the workstation 400 can send the translated input data to the access terminal 425 via the proxy library 521 over the connection 420a, 615.

Afterwards, the access terminal 425 via the proxy agent 507 can receive the translated input data from the workstation 400, 617. Subsequently, the access terminal 425 can call the appropriate API(s) to handle input data at the access terminal 425, 619. Further, the access terminal 425 can output any data to the host UI 525.

Figure 7A:
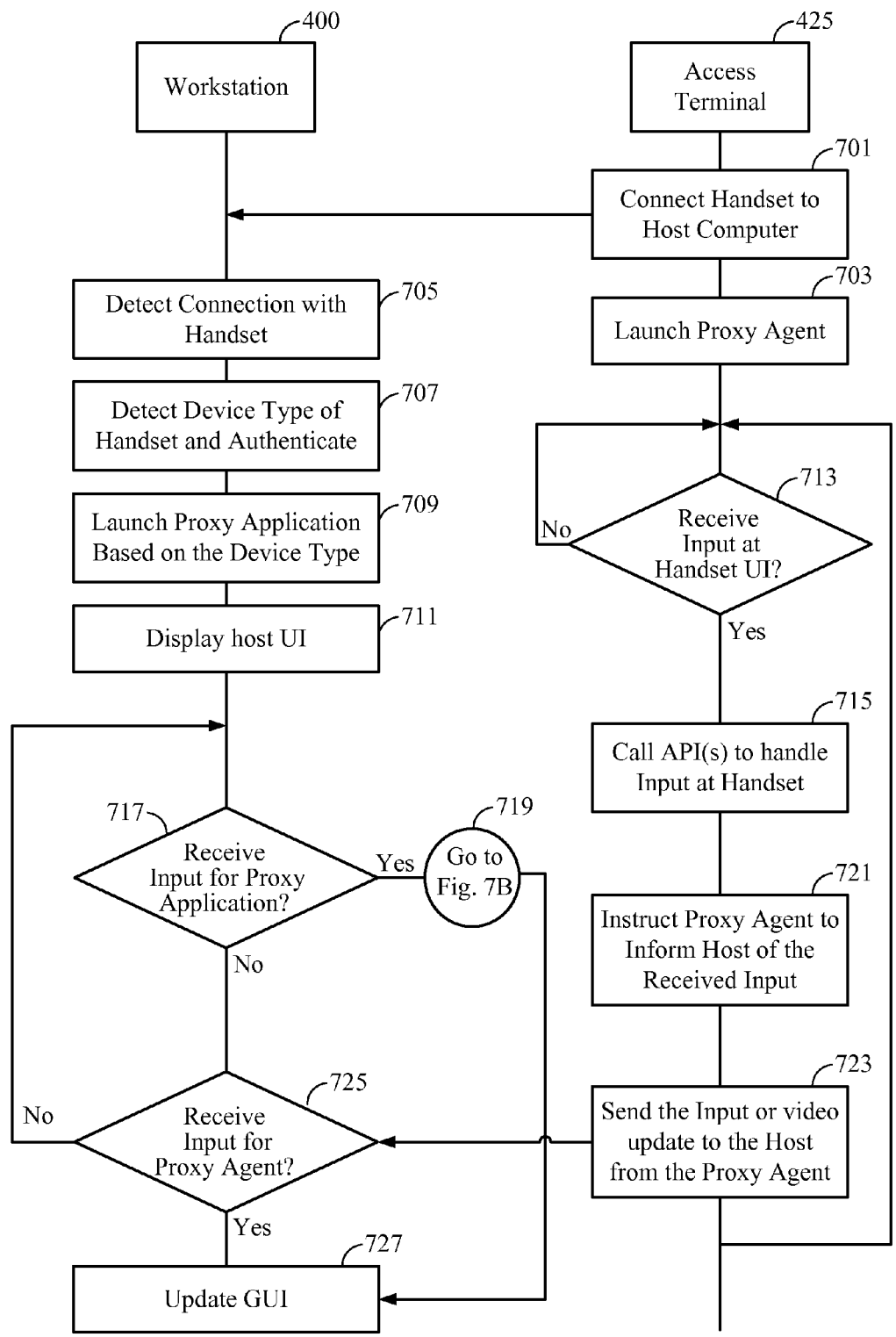
FIGS. 7A and 7B illustrate another exemplary process of exporting a handset application's user interface to a workstation in accordance with at least one embodiment of the invention.
Figure 7B:
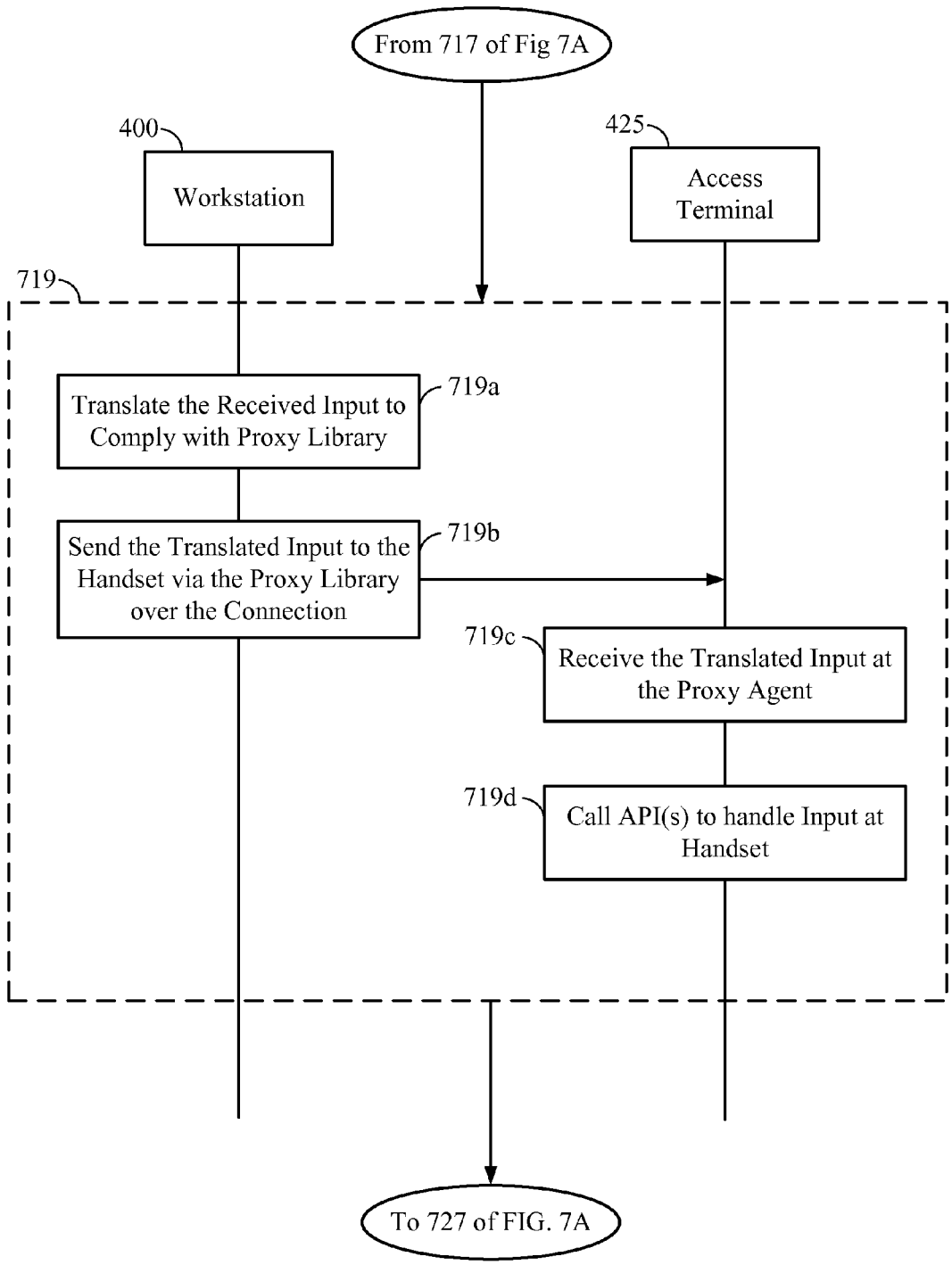

FIGS. 7A and 7B illustrate a process of exporting a handset application's user interface to a workstation according to another embodiment of the present invention. Referring to FIGS. 7A and 7B, the access terminal 425 can be connected to a workstation 400. For example, in this exemplary embodiment the user of the access terminal 425 could input data to either the access terminal 425 or the workstation 400 while the access terminal 425 is docked with the workstation 400.

Accordingly, the access terminal 425 can be connected to the workstation 400 via connection 420, 701. Next, the proxy agent application is launched on the access terminal 425, 703. Alternatively, the proxy agent application can be launched at the access terminal 425 in 703 upon receipt of a signaling message from the workstation 400 after the launch of the proxy application in 709 thereon. Afterwards, the workstation 400 can detect the connection 420 with the access terminal 425, 705.

Subsequently, the workstation 400 can detect the device type and can authenticate the device type, 707. For example, a user of the workstation 400 and/or access terminal 425 can use a password or a certificate-based mechanism to ensure appropriate access to the workstation 400 or access terminal 425. Furthermore, device type detection may also be utilized such that the proxy library 521 and the proxy agent 507 may be aware of the device model attached, and/or the device type attributes including display size, color depth, etc.

Next, the workstation 400 can launch the proxy application 523, 709. Afterwards, the workstation 400 can display the host UI 525, 711. Subsequently, the access terminal 425 can determine if input data has been received by the proxy agent 507, 713. If input data has been received by the access terminal 425, then the process proceeds to 715. If input data has not been received by the access terminal 425, then the process proceeds to 713.

Next, the access terminal 425 can call the appropriate API(s) the API to handle input data at the access terminal 425, 715. Afterwards, the workstation 400 can determine if input data has been received by the proxy application 523, 717. If input data has been received by the workstation 400, then the process proceeds to 719. If input data has not been received by the workstation 400, then the process proceeds to 725.

Referring to FIG. 7B, the details of 719 are illustrated. The workstation 400 can translate the received input data to comply with the requirements of the proxy library 521, 719a. The received input data can be translated in order to account for any discrepancies in format between the received input data and the proxy library 521. Next, the workstation 400 can send the translated input data to the access terminal 425 via the proxy library 521 over the connection 420a, 719b. The access terminal 425 can receive the translated input data via the proxy agent 507 from the workstation 400, 719c. Afterwards, the access terminal 425 can call the appropriate API(s) to handle input data at the access terminal 425, 719d. Afterwards, the process can proceed to 727 where the access terminal 425 can output any data to the host UI 525.

Referring to FIG. 7A again, the access terminal 425 can instruct the proxy agent 507 to inform the workstation 400 of the received data input, 721. Next, the access terminal 425 can send input data or video update(s) to the workstation 400 via the proxy agent 507, 723. Afterwards, the workstation 400 can determine if input data is received from the proxy agent 507, 725. If the workstation 400 determines that input data has been received by the workstation 400, then the process proceeds to 727. If the workstation 400 determines that input data has not been received by the workstation 400, then the process proceeds to 717. Next, the workstation 400 can update the host UI 525 to reflect any changes previously made 727. At this point, the process returns to 713 and can repeat for a subsequent user input.

Figure 8A:
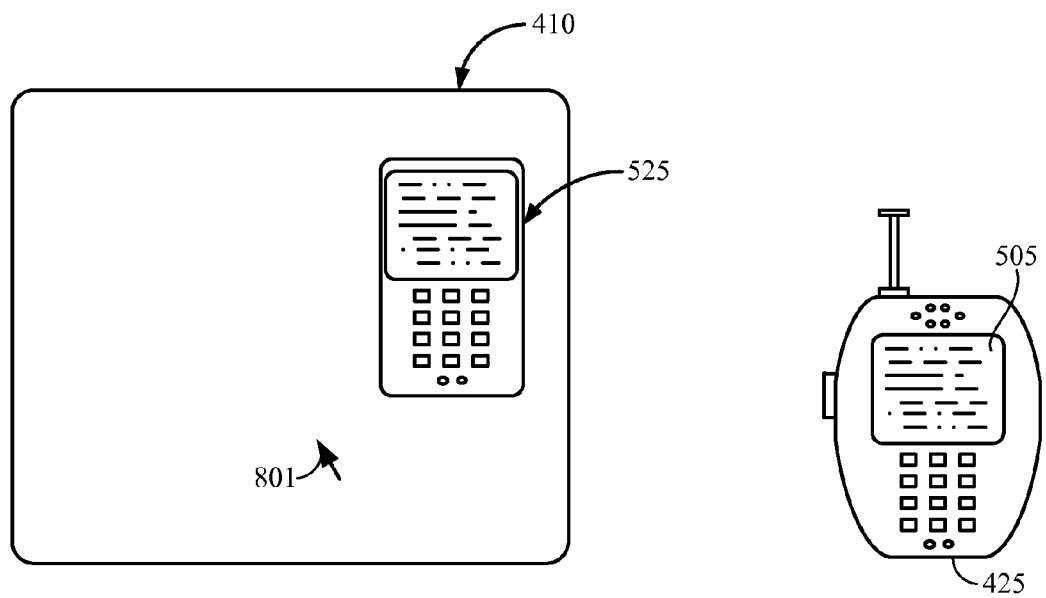
FIG. 8A illustrates an exemplary illustration of the access terminal/user interface and the display of the workstation in accordance with at least one embodiment of the invention.

FIG. 8A illustrates an exemplary illustration of the access terminal/user interface and the display of the workstation according to an embodiment of the present invention. Referring to FIG. 8A, the access terminal 425 can be connected to a workstation 400. For example, in this exemplary illustration access terminal 425/corresponding handset UI 505 and display 410/resulting host UI 525 are shown. Pointer 801 can be utilized in conjunction with host UI 525 in order to operate any of the functions of the access terminal 425 remotely from the workstation 400.

Figure 8B:
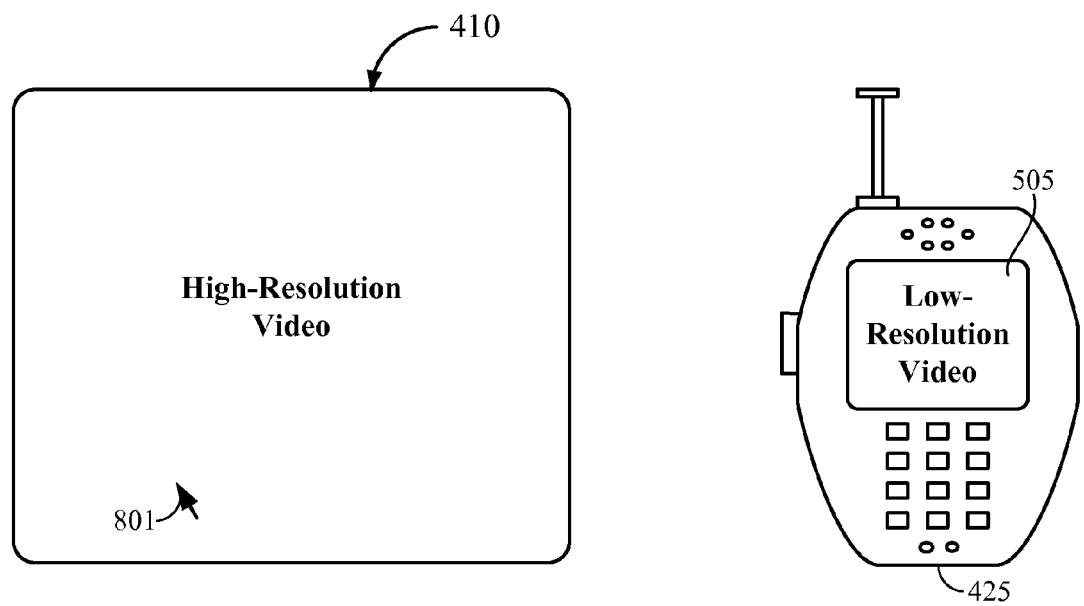
FIG. 8B illustrates another exemplary illustration of the access terminal/user interface and the display of the workstation in accordance with at least one embodiment of the invention.

FIG. 8B illustrates another exemplary illustration of the access terminal/user interface and the display of the workstation according to another embodiment of the present invention. Referring to FIG. 8B, the access terminal 425 can be connected to a workstation 400. For example, in this exemplary illustration access terminal 425/corresponding handset UI 505 and display 410/resulting host UI 525 are shown. Pointer 801 can be utilized in conjunction with host UI 525 in order to operate any of the functions of the access terminal 425 remotely from the workstation 400. While handset UI 505 can display a low-resolution video/image, the host UI 525 can display a high-resolution video/image. Therefore, the workstation 400 can enhance the video/images displayed on the display 410 by utilizing the media IO module 523c and the display module 523b of the proxy application 523. Thus, the workstation 400 can enhance the user's experience by providing enhanced and additional services to the user.

Figure 8C:
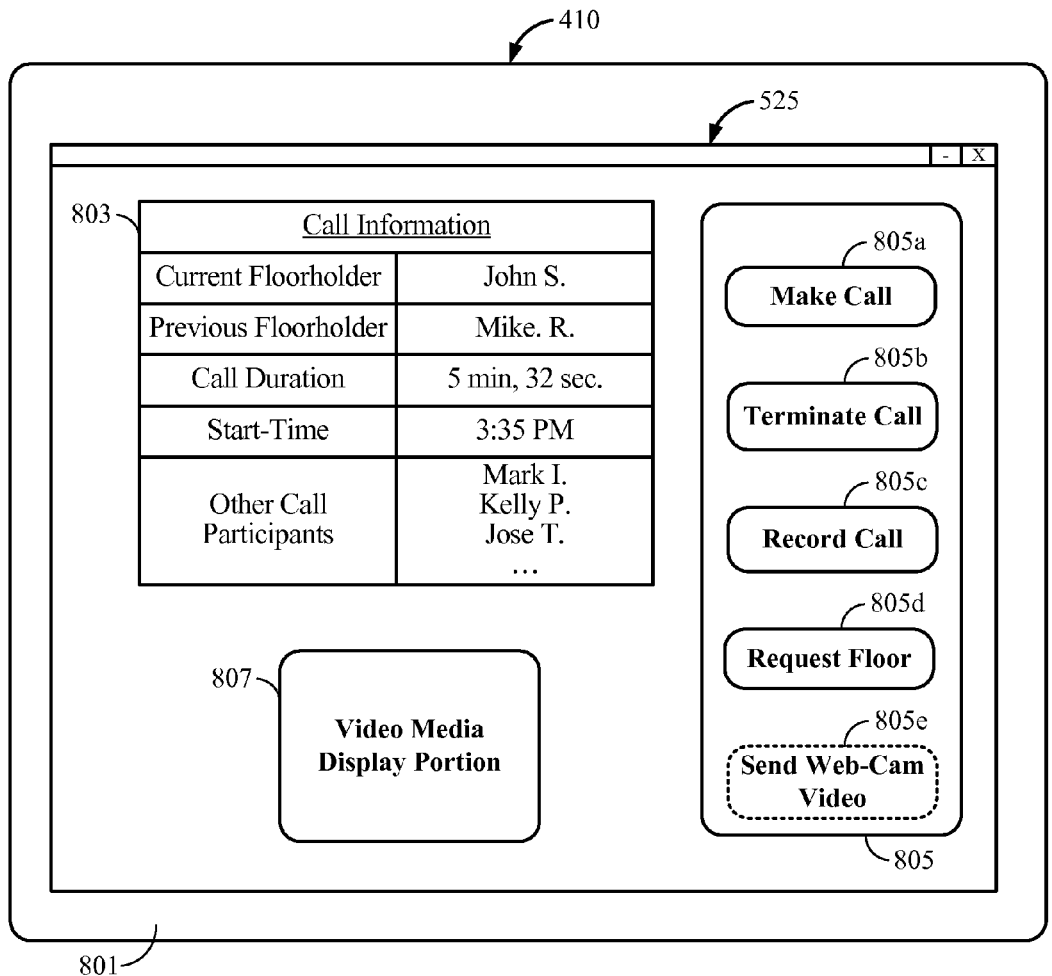
FIG. 8C illustrates yet another exemplary illustration of the access terminal/user interface and the display of the workstation in accordance with at least one embodiment of the invention.
Figure 8C:
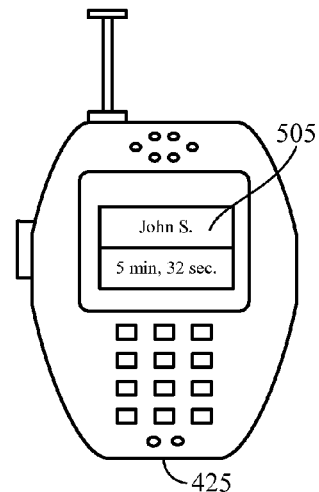

FIG. 8C illustrates another exemplary illustration of the access terminal/user interface and the display of the workstation according to another embodiment of the present invention. Referring to FIG. 8C, the access terminal 425 can be connected to a workstation 400. For example, in this exemplary illustration access terminal 425/corresponding handset UI 505 and display 410/resulting host UI 525 are shown. Pointer 801 can be utilized in conjunction with host UI 525 in order to operate any of the functions of the access terminal 425 remotely from the workstation 400. Handset UI 505 can display call details of a current/previous call(s). For example, in this exemplary illustration the handset UI 505 can display a current/previous call with user "John S." Further, the handset UI 505 can display the length of time for the current/previous call with user "John S."

Display 410 of workstation 400 can display the host UI 525. Further, the data displayed by display 410 can be the same or different data as that shown in the handset UI 505. For example, in this exemplary illustration host UI 525 can display enhanced information when compared with the content displayed on the handset UI 505. Further, host UI 525 can display a call information button 803, a function button 805 and a media display button 807.

The call information button 803 can provide details of the current/previous call(s). For example, the call information button 803 can include the current floorholder(s), the previous floorholder(s), the call duration(s), the call start-time, other call participants, etc.

The function button 805 can provide call functions of the access terminal 425. For example, the function button 805 can include make a call button 805a, terminate call button 805b, record call button 805c, request floor button 805d and send web-cam video button 805e.

The media display button 807 can provide a display that allows the user of the workstation 400 to view video(s)/image(s)/message(s).

Figure 9:
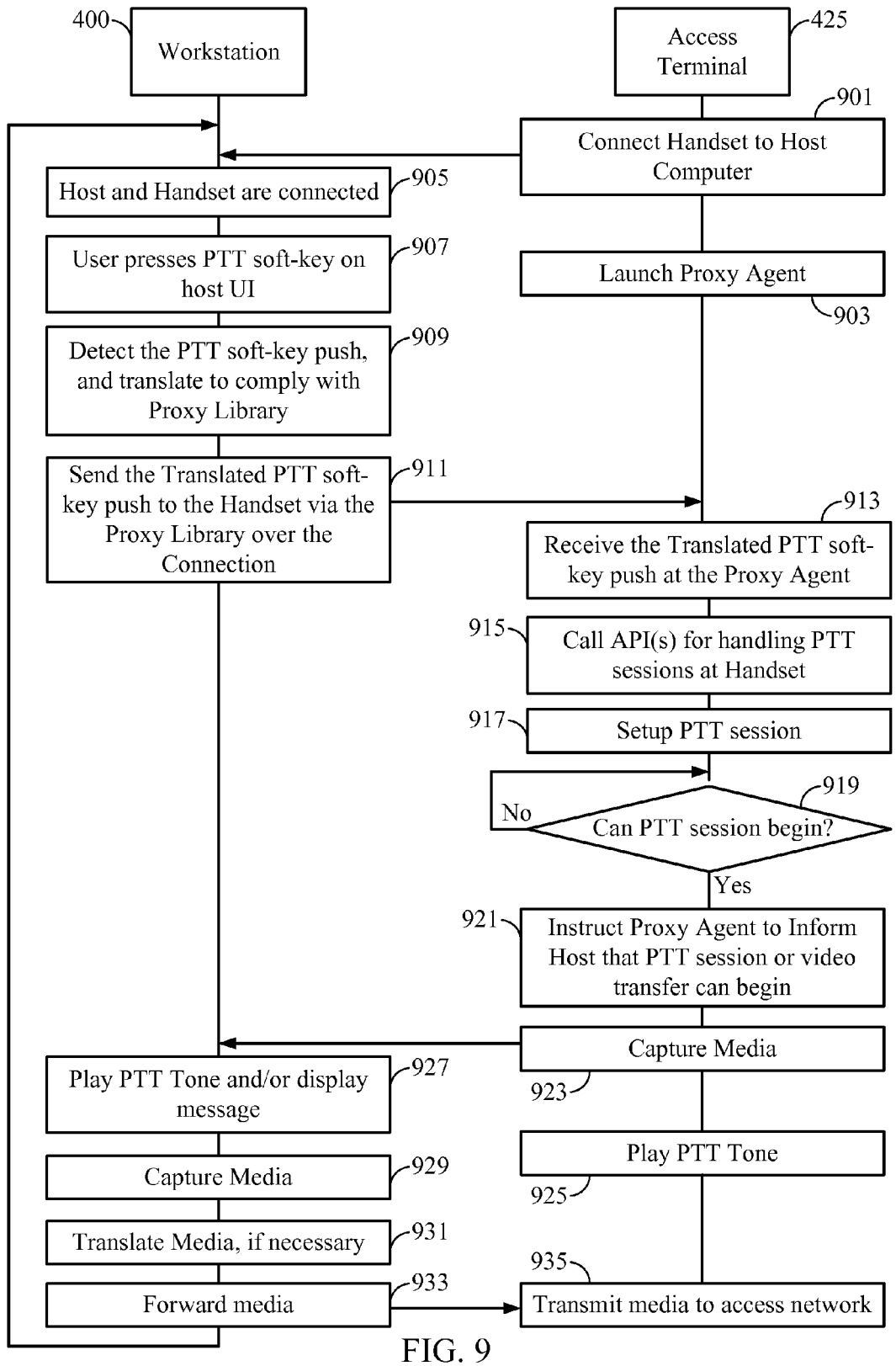
FIG. 9 illustrates another exemplary process of exporting a handset application's user interface to a workstation in accordance with at least one embodiment of the invention.

FIG. 9 illustrates a process of exporting a handset application's user interface to a workstation according to yet another embodiment of the present invention. Referring to FIG. 9, the access terminal 425 can be connected to a workstation 400. For example, in this exemplary embodiment the user of the access terminal 425 could make a push-to-talk (PTT) call type with another terminal or network user while the access terminal 425 is docked with the workstation 400.

Accordingly, the access terminal 425 can be connected to the workstation 400 via connection 420, 901. Next, the proxy agent application is launched on the access terminal 425, 903. Alternatively, the proxy agent application can be launched at the access terminal 425 in 903 upon receipt of a signaling message from the workstation 400 after the launch of the proxy application in 909 thereon (e.g., by the proxy application or by the user via the proxy library by pressing the PTT button in 907). Afterwards, the workstation 400 and the access terminal 425 can be connected, 905. Subsequently, the user of the workstation 400 and/or the access terminal 425 can press the PTT soft-key on the host UI 525, 907.

Next, the workstation 400 can detect the PTT soft-key push, launch the proxy application and can translate the function(s)/command(s) to comply with the function(s)/command(s) contained within the proxy library 521, 909. The received input data can be translated in order to account for any discrepancies in format between the received input data and the proxy library 521.

Afterwards, the workstation 400 can send the translated input data to the access terminal 425 via the proxy library 521 over the connection 420a, 911. Subsequently, the access terminal 425 can receive the translated input data via the proxy agent 507 from the workstation 400, 913. Next, the access terminal 425 can call or execute the appropriate API(s) to handle input data at the access terminal 425, 915. Afterwards, the access terminal 425 can setup a PTT session, 917. Subsequently, the access terminal 425 can determine if a PTT session can begin, 919. If the access terminal 425 determines that the PTT session can begin, then the process proceeds to 921. If the access terminal 425 determines that the PTT session cannot begin, then the process returns to 917.

Next, the access terminal 425 can instruct the proxy agent 507 to inform the workstation 400 that the PTT session or video transfer can begin, 921. Afterwards, the access terminal 425 can inform the workstation 400 that the PTT session or video transfer can begin, 923. Subsequently, the access terminal 425 can play a PTT tone to inform the user of the access terminal 425 that the PTT session or video transfer has begun, 925.

Next, the workstation 400 can play a PTT tone and/or display a message on the host UI 525 to inform the user of the workstation 400 that the PTT session or video transfer has begun, 927. Afterwards, the workstation 400 can capture any media desired, 929.

Next, the workstation 400 can translate the captured media (if necessary) so the media can be viewed by the access terminal 425 or any applications contained on the access terminal 425, 931. Subsequently, the workstation 400 can forward any media to the access terminal 425, 933. Afterwards, the access terminal 425 can transmit the captured media to the access network, 935. At this point, the process returns to 907 and can repeat for a subsequent user input.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of interfacing with one or more multimedia applications configured for execution on a handset via an independent computing device, comprising:
    detecting, at the computing device, that a connection between the computing device and the handset has been established, wherein the detected connection includes a first connection portion configured to exchange signaling information between the computing device and the handset, and a second connection portion configured to exchange media received between the computing device and the handset;
    launching a proxy application on the computing device, the proxy application on the computing device configured to interact with an agent application on the handset over the detected connection;
    receiving one or more user inputs on the computing device that are not displayed on the handset and that are associated with one or more multimedia applications configured for execution on the handset;
    sending one or more messages to the agent application based on the one or more user inputs; and
    receiving at least one of: media and signaling, related to the one or more multimedia applications in response to the one or more messages.

2. The method of claim 1, wherein the detected connection corresponds to at least one of: a wired connection, a wireless connection, and an Internet connection.

3. The method of claim 2, wherein the wired connection corresponds to a universal serial bus (USB) or IEEE 1394 connection.

4. The method of claim 1, further comprising:
    displaying a graphical user interface (GUI) associated with the proxy application, the GUI configured to include information related to the one or more multimedia applications,
    wherein the one or more user inputs are received through the GUI.

5. The method of claim 4, wherein the received media includes video media and the GUI displays the video media.

6. The method of claim 4, wherein the one or more multimedia applications include a call application, and the GUI displays information related to a current or potential call configured to be managed by the call application.

7. The method of claim 6, wherein the call application corresponds to a push-to-talk (PTT) application.

8. The method of claim 4 wherein the one or more multimedia applications include a game application, and the GUI displays information related to a current or potential gaming session, configured to be managed by the game application.

9. The method of claim 4, wherein the one or more multimedia applications include a web-browsing application, and the GUI displays information related to a current or potential web-browsing session configured to be managed by the web-browsing application.

10. The method of claim 4, wherein the GUI substantially corresponds to a display of the handset.

11. The method of claim 4, wherein the GUI corresponds to an enhanced version of a display of the handset.

12. The method of claim 11, wherein the GUI includes a higher-resolution video portion than a corresponding video-portion on the display of the handset, expanded and/or supplemental information associated with the one or more multimedia applications that is not present on the display of the handset and/or one or more additional input options that are not present on the display of the handset.

13. The method of claim 1, further comprising:
translating the one or more user inputs into a format that is expected to be recognized by the agent application, the translated one or more user inputs configured to facilitate one or more commands requested by a user via the one or more user inputs,
wherein sending one or more messages to the agent application comprises sending the translated one or more user inputs.

14. The method of claim 13, wherein translating the one or more user inputs into a format that is expected to be recognized by the agent application comprises interfacing the proxy application with a proxy library stored on the computing device.

15. The method of claim 13, wherein the one or more commands include a request to initiate a communication session, a request to terminate the communication session, a request to record media exchanged during the communication session, a request to obtain a floor for a push-to-talk (PTT) communication session, a request to send or stop sending one or more types of media during the communication session and/or a request to output one or more types of media on the computing device.

16. The method of claim 1, wherein one or more input mechanisms on the handset remain active while the handset is connected to the computing device.

17. The method of claim 16, wherein at least one of: the received media and signaling received at the computing device and related to the one or more multimedia applications is based at least in part on one or more user inputs received via the one or more input mechanisms on the handset while the handset is connected to the computing device.

18. The method of claim 1, wherein the proxy application functions to extend a user interface of the one or more multimedia applications from the handset to the computing device, such that a user can interact with the proxy application being executed on the computing device so as to control the one or more multimedia applications being executed on the handset.

19. A method of interfacing with one or more multimedia applications configured for execution on a handset that is connected to a computing device via the handset comprising:
establishing a connection between the handset and the computing device, wherein the connection includes a first connection portion configured to exchange signaling information between the computing device and the handset, and a second connection portion configured to exchange media received between the computing device and the handset;
launching an agent application on the handset, the agent application on the handset configured to interact with a proxy application on the computing device over the established connection;
receiving one or more messages, from the proxy application, based on one or more user inputs on the computing device that are not displayed on the handset and that are associated with one or more multimedia applications configured for execution on the handset;
executing the one or more multimedia applications based in part on the received one or more messages; and
sending at least one of: media and signaling related to the one or more executing multimedia applications to the computing device.

20. The method of claim 19, wherein the established connection corresponds to at least one of: a wired connection, a wireless connection and an Internet connection.

21. The method of claim 20, wherein the wired connection corresponds to a universal serial bus (USB) or IEEE 1394 connection.

22. The method of claim 19, wherein receiving one or more messages, from the proxy application comprises receiving the one or more messages based on one or more user inputs on the computing device that are received through a graphical user interface (GUI) displayed on the computing device.

23. The method of claim 22, further comprising:
displaying a separate graphical user interface (GUI) on the handset, the separate GUI configured to include information related to the one or more multimedia applications.

24. The method of claim 23, wherein the GUI on the computing device substantially corresponds to the separate GUI of the handset.

25. The method of claim 23, wherein the GUI on the computing device corresponds to an enhanced version of the separate GUI of the handset.

26. The method of claim 25, wherein the GUI on the computing device includes a higher-resolution video-portion than a corresponding video-portion on the separate GUI of the handset, expanded information and/or supplemental information associated with the one or more multimedia applications that is not present on the separate GUI of the handset, and/or one or more additional input options that are not present on the separate GUI of the handset.

27. The method of claim 22, wherein sending at least one of: media and signaling related to the one or more executing multimedia applications to the computing device comprises sending video media to be displayed on the GUI of the computing device.

28. The method of claim 22, wherein the one or more multimedia applications include a call application, and wherein sending at least one of: media and signaling related to the one or more executing multimedia applications to the computing device comprises sending information to be displayed on the GUI of the computing device, the information related to a current or potential call configured to be managed by the call application.

29. The method of claim 28, wherein the call application corresponds to a push-to-talk (PTT) application.

30. The method of claim 22, wherein the one or more multimedia applications include a game application, and wherein sending at least one of: media and signaling related to the one or more executing multimedia applications to the computing device comprises sending information to be displayed on the GUI of the computing device, the information related to a current or potential gaming session, configured to be managed by the game application.

31. The method of claim 22, wherein the one or more multimedia applications include a web-browsing application, and wherein sending at least one of: media and signaling related to the one or more executing multimedia applications to the computing device comprises sending information to be displayed on the GUI of the computing device, the information related to a current or potential web-browsing session, configured to be managed by the web-browsing application.

32. The method of claim 19, wherein the one or more messages correspond to translated versions of the one or more user inputs, the one or more inputs being translated into a format that is expected to be recognized by the agent application, the translated one or more user inputs configured to facilitate one or more commands requested by a user via the one or more user inputs.

33. The method of claim 32, wherein the one or more commands include at least one of: a request to initiate a communication session, a request to terminate the communication session, a request to record media exchanged during the communication session, a request to obtain a floor for a push-to-talk (PTT) communication session, a request to send or stop sending one or more types of media during the communication session and a request to output one or more types of media on the computing device.

34. The method of claim 19, wherein one or more input mechanisms on the handset remain active while the handset is connected to the computing device.

35. The method of claim 34, wherein the sent at least one of: media and signaling is based at least in part on one or more user inputs received via the one or more input mechanisms on the handset while the handset is connected to the computing device.

36. The method of claim 19, wherein the proxy application functions to extend a user interface of the one or more multimedia applications from the handset to the computing device, such that a user can interact with the proxy application being executed on the computing device so as to control the one or more multimedia applications being executed on the handset.

37. A computing device independent of a handset configured for executing one or more multimedia applications, comprising:
 means for detecting, at the computing device, that a connection between the computing device and the handset has been established, wherein the detected connection includes a first connection portion configured to exchange signaling information between the computing device and the handset, and a second connection portion configured to exchange media received between the computing device and the handset;
 means for launching a proxy application on the computing device, the proxy application on the computing device configured to interact with an agent application on the handset over the detected connection;
 means for receiving one or more user inputs on the computing device that are not displayed on the handset and that are associated with one or more multimedia applications configured for execution on the handset;
 means for sending one or more messages to the agent application based on the one or more user inputs; and
 means for receiving at least one of: media and signaling related to the one or more multimedia applications in response to the one or more messages.

38. A handset configured for executing one or more multimedia applications and further configured to interface with an independent computing device, comprising:
 means for establishing a connection between the handset and the computing device, wherein the connection includes a first connection portion configured to exchange signaling information between the computing device and the handset, and a second connection portion configured to exchange media received between the computing device and the handset;
 means for launching an agent application on the handset, the agent application on the handset configured to interact with a proxy application on the computing device over the established connection;
 means for receiving one or more messages, from the proxy application, based on one or more user inputs on the computing device that are not displayed on the handset and that are associated with one or more multimedia applications configured for execution on the handset;
 means for executing the one or more multimedia applications based in part on the received one or more messages; and
 means for sending at least one of: media and signaling related to the one or more executing multimedia applications to the computing device.

39. A computing device independent of a handset configured for executing one or more multimedia applications, comprising:
 a processor configured with software instructions to perform operations comprising:
  detecting, at the computing device, that a connection between the computing device and the handset has been established, wherein the detected connection includes a first connection portion configured to exchange signaling information between the computing device and the handset, and a second connection portion configured to exchange media received between the computing device and the handset;
  launching a proxy application on the computing device, the proxy application on the computing device configured to interact with an agent application on the handset over the detected connection;
  receiving one or more user inputs on the computing device that are not displayed on the handset and that are associated with one or more multimedia applications configured for execution on the handset;
  sending one or more messages to the agent application based on the one or more user inputs; and
  receiving at least one of: media and signaling related to the one or more multimedia applications in response to the one or more messages.

40. A handset configured for executing one or more multimedia applications and further configured to interface with an independent computing device, comprising:
 a processor configured with software instructions to perform operations comprising:
  establishing a connection between the handset and the computing device, wherein the connection includes a first connection portion configured to exchange signaling information between the computing device and the handset, and a second connection portion configured to exchange media received between the computing device and the handset;
  launching an agent application on the handset, the agent application on the handset configured to interact with a proxy application on the computing device over the established connection;
  receiving one or more messages, from the proxy application, based on one or more user inputs on the computing device that are not displayed on the handset and that are associated with one or more multimedia applications configured for execution on the handset;
  executing the one or more multimedia applications based in part on the received one or more messages; and
  sending at least one of: media and signaling related to the one or more executing multimedia applications to the computing device.

41. A non-transitory computer-readable storage medium having stored thereon processor-executable instructions configured to cause a processor of a computing device independent of a handset configured for executing one or more multimedia applications, to perform operations, comprising:
 detecting, at the computing device, that a connection between the computing device and the handset has been established, wherein the detected connection includes a first connection portion configured to exchange signaling information between the computing device and the handset, and a second connection portion configured to exchange media received between the computing device and the handset;

launching a proxy application on the computing device, the proxy application on the computing device configured to interact with an agent application on the handset over the detected connection;

receiving one or more user inputs on the computing device that are not displayed on the handset and that are associated with one or more multimedia applications configured for execution on the handset;

sending one or more messages to the agent application based on the one or more user inputs; and receiving at least one of: media and signaling related to the one or more multimedia applications in response to the one or more messages.

42. A non-transitory computer-readable storage medium having stored thereon processor-executable instructions configured to cause a processor of a handset configured for executing one or more multimedia applications and further configured to interface with an independent computing device, causes the processor of the handset to perform operations, comprising:

establishing a connection between the handset and the computing device, wherein the connection includes a first connection portion configured to exchange signaling information between the computing device and the handset, and a second connection portion configured to exchange media received between the computing device and the handset;

launching an agent application on the handset, the agent application on the handset configured to interact with a proxy application on the computing device over the established connection;

receiving one or more messages, from the proxy application based on one or more user inputs on the computing device that are not displayed on the handset and that are associated with one or more multimedia applications configured for execution on the handset;

executing the one or more multimedia applications based in part on the received one or more messages; and sending at least one of: media and signaling related to the one or more executing multimedia applications to the computing device.

* * * * *